United States Patent
Zheng et al.

(10) Patent No.: US 12,374,356 B1
(45) Date of Patent: Jul. 29, 2025

(54) PINNED SHIELD WITH CONTROLLABLE EXCHANGE BIAS FIELD

(71) Applicant: Western Digital Technologies, Inc., San Jose, CA (US)

(72) Inventors: Yuankai Zheng, Fremont, CA (US); Zhitao Diao, Fremont, CA (US); Chih-Ching Hu, Pleasanton, CA (US); Yung-Hung Wang, San Jose, CA (US); Chen-Jung Chien, Mountain View, CA (US); Ming Mao, Dublin, CA (US); James Mac Freitag, Sunnyvale, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/425,514

(22) Filed: Jan. 29, 2024

(51) Int. Cl.
*G11B 5/39* (2006.01)

(52) U.S. Cl.
CPC .......... *G11B 5/3912* (2013.01); *G11B 5/3932* (2013.01); *G11B 5/3954* (2013.01); *G11B 2005/3996* (2013.01)

(58) Field of Classification Search
None
See application file for complete search history.

(56) References Cited

U.S. PATENT DOCUMENTS

| | | | |
|---|---|---|---|
| 8,873,204 B1 | 10/2014 | Gao et al. | |
| 8,976,493 B1 | 3/2015 | Mashima et al. | |
| 9,042,058 B1 | 5/2015 | Li et al. | |
| 9,401,163 B2 | 7/2016 | McKinlay et al. | |
| 9,536,549 B1 * | 1/2017 | Ge et al. | G11B 5/3912 |
| 9,570,100 B1 | 2/2017 | Freitag et al. | |
| 9,679,591 B1 * | 6/2017 | Hao et al. | G11B 5/3912 |
| 9,786,301 B1 * | 10/2017 | Li et al. | G11B 5/3912 |
| 9,786,305 B1 | 10/2017 | Li et al. | |
| 10,249,329 B1 * | 4/2019 | Hu et al. | G11B 5/3912 |
| 11,514,935 B1 * | 11/2022 | Liu et al. | G11B 5/3912 |
| 2016/0055868 A1 | 2/2016 | Gao et al. | |

(Continued)

OTHER PUBLICATIONS

Wood, Roger, "Shingled Magnetic Recording (SMR) and Two-Dimensional MagneticRecording (TDMR)", Journal of Magnetism and Magnetic Materials, vol. 561, Nov. 2022, pp. 1-5, <https://www.sciencedirect.com/science/article/abs/pii/S0304885322005820?via%3Dihub>.

*Primary Examiner* — Craig A. Renner
(74) *Attorney, Agent, or Firm* — PATTERSON + SHERIDAN, LLP

(57) ABSTRACT

The present disclosure generally relates to a two-dimensional magnetic recording (TDMR) read head. The TDMR read head comprises a first sensor, a second sensor, and a middle shield (MS) disposed between the first and second sensors. The MS comprises a seed layer, an IrMn layer disposed on the seed layer, an insertion layer comprising Ru or CoFe disposed on the IrMn layer, a first NiFe layer having a pinned magnetization, and a cap layer disposed over the first NiFe layer. In one embodiment, the MS further comprises an Ru layer disposed on the first NiFe layer and a second NiFe layer disposed on the Ru layer, the second NiFe layer having a pinned magnetization in a direction antiparallel to the first NiFe layer. The insertion layer comprising Ru decreases an exchange energy of the MS. The insertion layer comprising CoFe increases an exchange energy of the MS.

20 Claims, 6 Drawing Sheets

(56) References Cited

U.S. PATENT DOCUMENTS

| | | |
|---|---|---|
| 2016/0171993 A1 | 6/2016 | Okubo |
| 2016/0336030 A1* | 11/2016 | Xiao et al. ........... G11B 5/3912 |
| 2017/0069341 A1 | 3/2017 | Garfunkel et al. |
| 2024/0233762 A1* | 7/2024 | Liu et al. ............. G11B 5/3912 |

* cited by examiner

PINNED SHIELD WITH CONTROLLABLE EXCHANGE BIAS FIELD

BACKGROUND OF THE DISCLOSURE

Field of the Disclosure

Embodiments of the present disclosure generally relate to a dual free layer (DFL) two-dimensional magnetic recording (TDMR) read head.

Description of the Related Art

Two-dimensional magnetic recording (TDMR) read heads generally have a first sensor, oftentimes referred to as a lower reader, and a second sensor, oftentimes referred to as an upper reader. The readers are spaced by a middle shield. Both the upper reader and the lower reader are substantially identical, each comprising two free layers to be dual free layer (DFL) readers or sensors. In DFL reader operation, the two free layers of each reader are individually stabilized longitudinally by an anti-ferromagnetically coupled (AFC) soft bias (SB) and biased transversally by a permanent magnet or a rear hard bias (RHB) structure from the stripe back edge of the sensor.

The middle shield between the upper and lower readers in TDMR read heads serves as a bottom shield for the upper reader. During operation, the middle shield may flip magnetization states due to magnetic domain movement in the middle shield disposed adjacent to the second reader, under either writer stress or external field disturbance. The middle shield switching magnetization states may change the biasing of a free layer of either the upper or lower reader, flip reader signal cross-track profile, and/or introduce position error signals (PES) error at servo writing and associated HDD failure.

Therefore, there is a need in the art for an improved TDMR read head, especially for DFL.

SUMMARY OF THE DISCLOSURE

The present disclosure generally relates to a two-dimensional magnetic recording (TDMR) read head. The TDMR read head comprises a first sensor, a second sensor, and a middle shield (MS) disposed between the first and second sensors. The MS comprises a seed layer, an IrMn layer disposed on the seed layer, an insertion layer comprising Ru or CoFe disposed on the IrMn layer, a first NiFe layer having a pinned magnetization, and a cap layer disposed over the first NiFe layer. In one embodiment, the MS further comprises an Ru layer disposed on the first NiFe layer and a second NiFe layer disposed on the Ru layer, the second NiFe layer having a pinned magnetization in a direction antiparallel to the first NiFe layer. The insertion layer comprising Ru decreases an exchange energy of the MS. The insertion layer comprising CoFe increases an exchange energy of the MS.

In one embodiment, a two dimensional magnetic recording (TDMR) read head comprises a first read sensor, a second read sensor disposed over the first read sensor, and a middle shield disposed between the first read sensor and the second read sensor, the middle shield comprising: a seed layer, an antiferromagnetic layer disposed on the seed layer, the antiferromagnetic layer comprising IrMn, PtMn, NiMn, FeMn, IrMnCr, and combinations thereof, an insertion layer disposed on the antiferromagnetic layer, the insertion layer comprising Ru or CoFe, and a ferromagnetic layer disposed on the insertion layer, the ferromagnetic layer comprising NiFe or NiCoFe.

In another embodiment, a two dimensional magnetic recording (TDMR) read head comprises a first read sensor, a second read sensor disposed over the first read sensor, and a middle shield disposed between the first read sensor and the second read sensor, the middle shield comprising: a seed layer, an antiferromagnetic layer disposed on the seed layer, the antiferromagnetic layer comprising IrMn, PtMn, NiMn, FeMn, IrMnCr, and combinations thereof, an insertion layer disposed on the antiferromagnetic layer, the insertion layer comprising Ru or CoFe, a first NiFe or NiCoFe layer disposed on the insertion layer, the first NiFe or NiCoFe layer having a pinned magnetization in a first direction, a Ru layer disposed on the first NiFe or NiCoFe layer, a second NiFe or NiCoFe layer disposed on the Ru layer, the second NiFe or NiCoFe layer having a pinned magnetization in a second direction antiparallel to the first direction, and a cap layer disposed on the second NiFe or NiCoFe layer.

In yet another embodiment, a two dimensional magnetic recording (TDMR) read head comprises a first lower shield, a first dual free layer (DFL) read sensor disposed over the first lower shield, a first upper shield disposed over the first DFL read sensor, a middle shield disposed over the first upper shield, the middle shield comprising: a seed layer comprising Ta and Ru, an IrMn layer disposed on the seed layer, an insertion layer disposed on the IrMn layer, the insertion layer comprising Ru or CoFe, a first NiFe layer disposed on the insertion layer, the first NiFe layer having a pinned magnetization in a first direction, and a cap layer disposed over the first NiFe layer, a second DFL read sensor disposed over the middle shield, and a second upper shield disposed over the second DFL read sensor.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a two-dimensional magnetic recording (TDMR) read head. The TDMR read head comprises a first sensor, a second sensor, and a middle shield (MS) disposed between the first and second sensors. The MS comprises a seed layer, an IrMn layer disposed on the seed layer, an insertion layer comprising Ru or CoFe disposed on the IrMn layer, a first NiFe layer having a pinned magnetization, and a cap layer disposed over the first NiFe layer. In one embodiment, the MS further comprises an Ru layer disposed on the first NiFe layer and a second NiFe layer disposed on the Ru layer, the second NiFe layer having a pinned magnetization in a direction antiparallel to the first NiFe layer. The insertion layer comprising Ru decreases an exchange energy of the MS. The insertion layer comprising CoFe increases an exchange energy of the MS.

Figure 1:
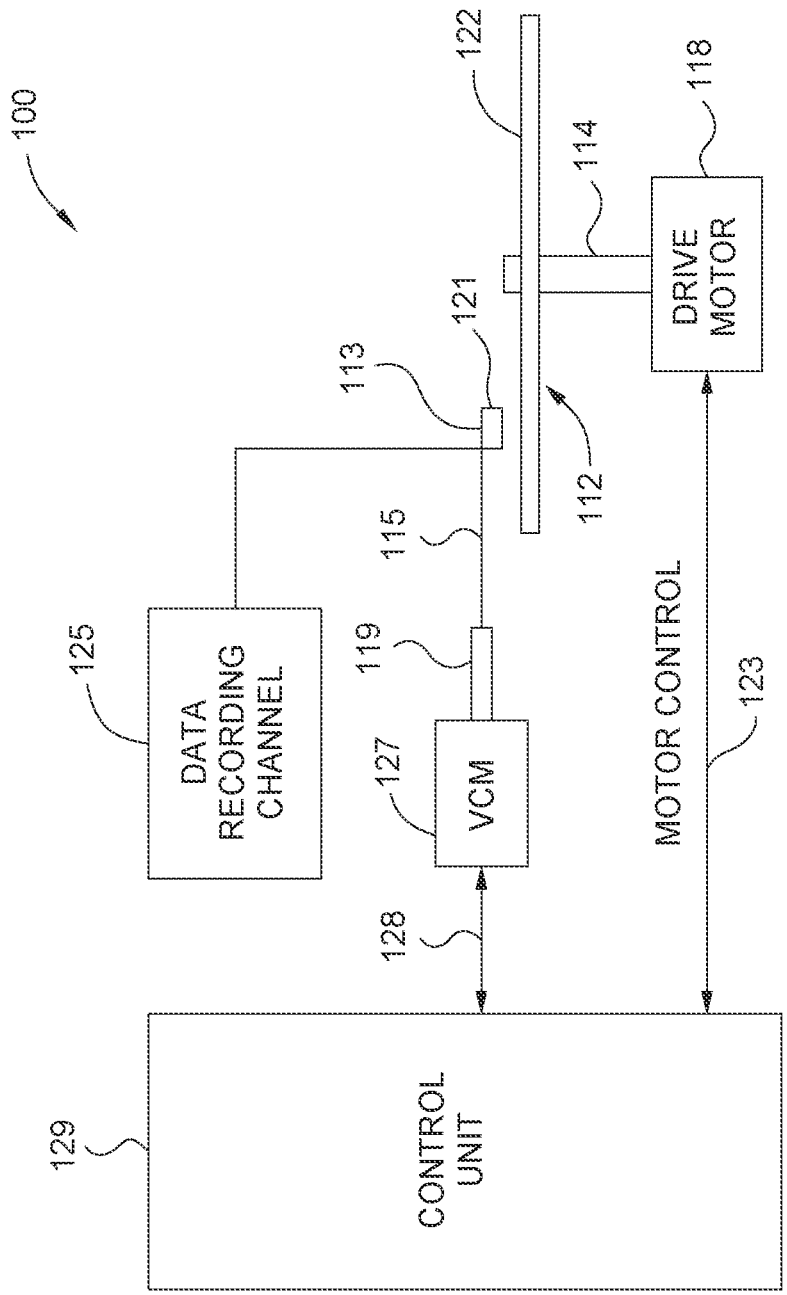
FIG. 1 illustrates a disk drive embodying this disclosure.

FIG. 1 is a schematic illustration of a magnetic recording device 100, according to one implementation. The magnetic recording device 100 includes a magnetic recording head, such as a write head. The magnetic recording device 100 is a magnetic media drive, such as a hard disk drive (HDD). Such magnetic media drives may be a single drive/device or include multiple drives/devices. For the ease of illustration, a single disk drive is shown as the magnetic recording device 100 in the implementation illustrated in FIG. 1. The magnet recording device 100 (e.g., a disk drive) includes at least one rotatable magnetic disk 112 supported on a spindle 114 and rotated by a drive motor 118. The magnetic recording on each rotatable magnetic disk 112 is in the form of any suitable patterns of data tracks, such as annular patterns of concentric data tracks on the rotatable magnetic disk 112.

At least one slider 113 is positioned near the rotatable magnetic disk 112. Each slider 113 supports a head assembly 121. The head assembly 121 includes one or more magnetic recording heads (such as read/write heads), such as a write head including a spintronic device. As the rotatable magnetic disk 112 rotates, the slider 113 moves radially in and out over the disk surface 122 so that the head assembly 121 may access different tracks of the rotatable magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by a control unit 129.

The head assembly 121, such as a write head of the head assembly 121, includes a media facing surface (MFS) such as an air bearing surface (ABS) that faces the disk surface 122. During operation of the magnetic recording device 100, the rotation of the rotatable magnetic disk 112 generates an air or gas bearing between the slider 113 and the disk surface 122 which exerts an upward force or lift on the slider 113. The air or gas bearing thus counter-balances the slight spring force of suspension 115 and supports the slider 113 off and slightly above the disk surface 122 by a small, substantially constant spacing during operation.

The various components of the magnetic recording device 100 are controlled in operation by control signals generated by control unit 129, such as access control signals and internal clock signals. The control unit 129 includes logic control circuits, storage means and a microprocessor. The control unit 129 generates control signals to control various system operations such as drive motor control signals on a line 123 and head position and seek control signals on a line 128. The control signals on line 128 provide the desired current profiles to optimally move and position slider 113 to the desired data track on rotatable magnetic disk 112. Write and read signals are communicated to and from the head assembly 121 by way of recording channel 125. In one embodiment, which can be combined with other embodiments, the magnetic recording device 100 may further include a plurality of media, or disks, a plurality of actuators, and/or a plurality number of sliders.

Figure 2:
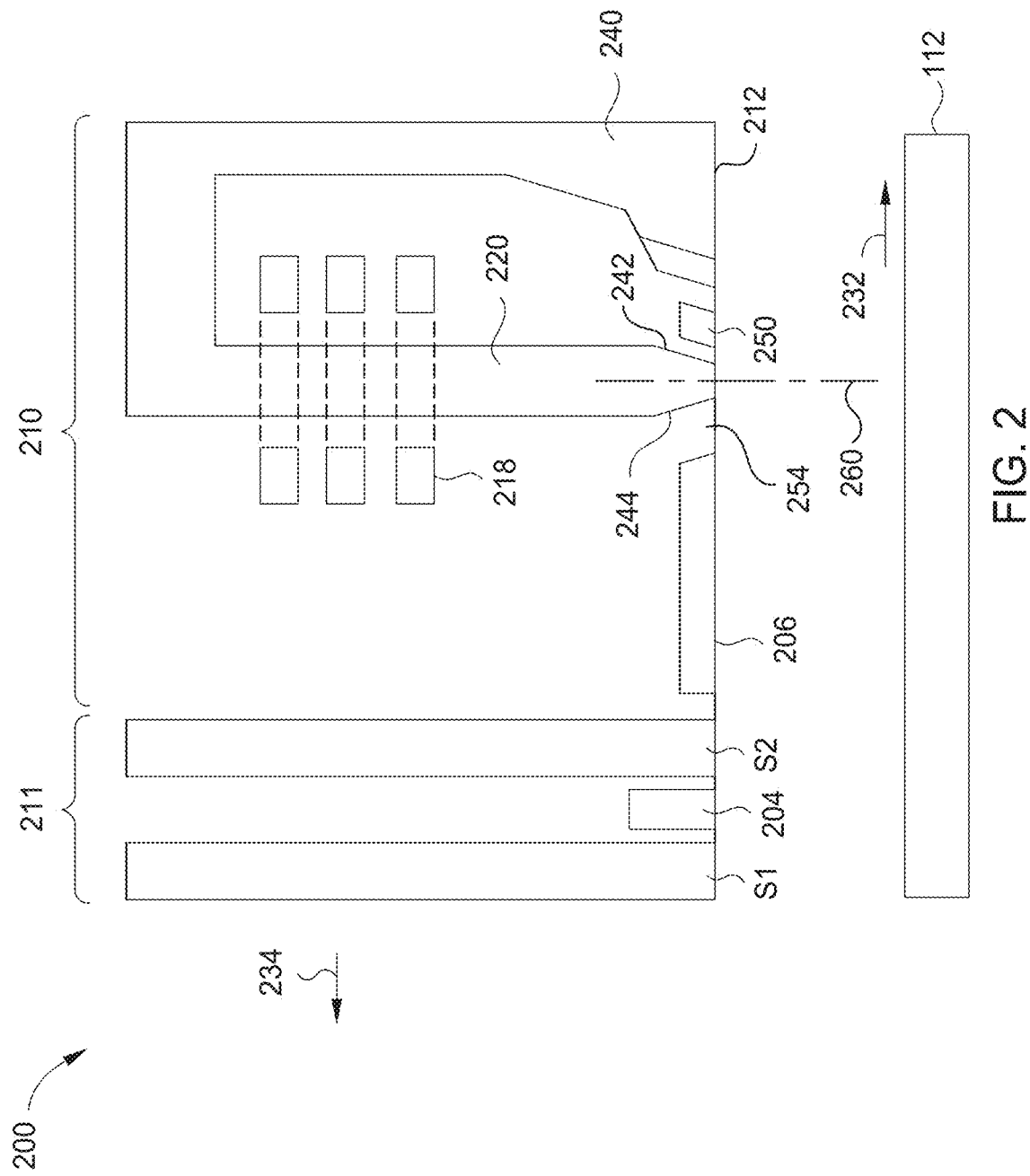
FIG. 2 is a fragmented, cross-sectional side view through the center of a read/write head facing a magnetic media, according to one embodiment.

FIG. 2 is a schematic illustration of a cross sectional side view of a head assembly 200 facing the rotatable magnetic disk 112 shown in FIG. 1 or other magnetic storage medium, according to one implementation. The head assembly 200 may correspond to the head assembly 121 described in FIG. 1. The head assembly 200 includes a media facing surface (MFS) 212, such as an air bearing surface (ABS), facing the rotatable magnetic disk 112. As shown in FIG. 2, the rotatable magnetic disk 112 relatively moves in the direction indicated by the arrow 232 and the head assembly 200 relatively moves in the direction indicated by the arrow 234.

In one embodiment, which can be combined with other embodiments, the head assembly 200 includes a magnetic read head 211. The magnetic read head 211 may include a sensing element 204 disposed between shields S1 and S2. The sensing element 204 is a magnetoresistive (MR) sensing element, such an element exerting a tunneling magneto-resistive (TMR) effect, a magneto-resistance (GMR) effect, an extraordinary magneto-Resistive (EMR) effect, or a spin torque oscillator (STO) effect. The magnetic fields of magnetized regions in the rotatable magnetic disk 112, such as perpendicular recorded bits or longitudinal recorded bits, are detectable by the sensing element 204 as the recorded bits. Here, magnetic read head 211 is a simplified representation of the various disclosed embodiments which will include multiple sensing elements and shields as further described below.

The head assembly 200 includes a write head 210. In one embodiment, which can be combined with other embodiments, the write head 210 includes a main pole 220, a leading shield 206, a trailing shield (TS) 240, and optionally a spintronic device 250 (or other magnetic stack or conductive material) disposed between the main pole 220 and the TS 240. The main pole 220 serves as a first electrode. Each of the main pole 220, the spintronic device 250, the leading shield 206, and the trailing shield (TS) 240 can have a front portion at the MFS.

The main pole 220 includes a magnetic material, such as CoFe, CoFeNi, or FeNi, other suitable magnetic materials. In one embodiment, which can be combined with other embodiments, the main pole 220 includes small grains of magnetic materials in a random texture, such as body-centered cubic (BCC) materials formed in a random texture. In one example, a random texture of the main pole 220 is formed by electrodeposition. The write head 210 includes a coil 218 around the main pole 220 that excites the main pole 220 to produce a writing magnetic field for affecting a magnetic recording medium of the rotatable magnetic disk 112. The coil 218 may be a helical structure or one or more sets of pancake structures.

In one embodiment, which can be combined with other embodiments, the main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree or different degree of taper with respect to a longitudinal axis 260 of the main pole 220. In one embodiment, which can be combined with other embodiments, the main pole 220 does not include the trailing taper 242 and the leading taper 244. In such an embodiment, the main pole 220 includes a trailing side and a leading side in which the trailing side and the leading side are substantially parallel.

The TS 240 includes a magnetic material, such as FeNi, or other suitable magnetic materials, serving as a second electrode and return pole for the main pole 220. The leading shield 206 may provide electromagnetic shielding and is separated from the main pole 220 by a leading gap 254.

Figure 3A:
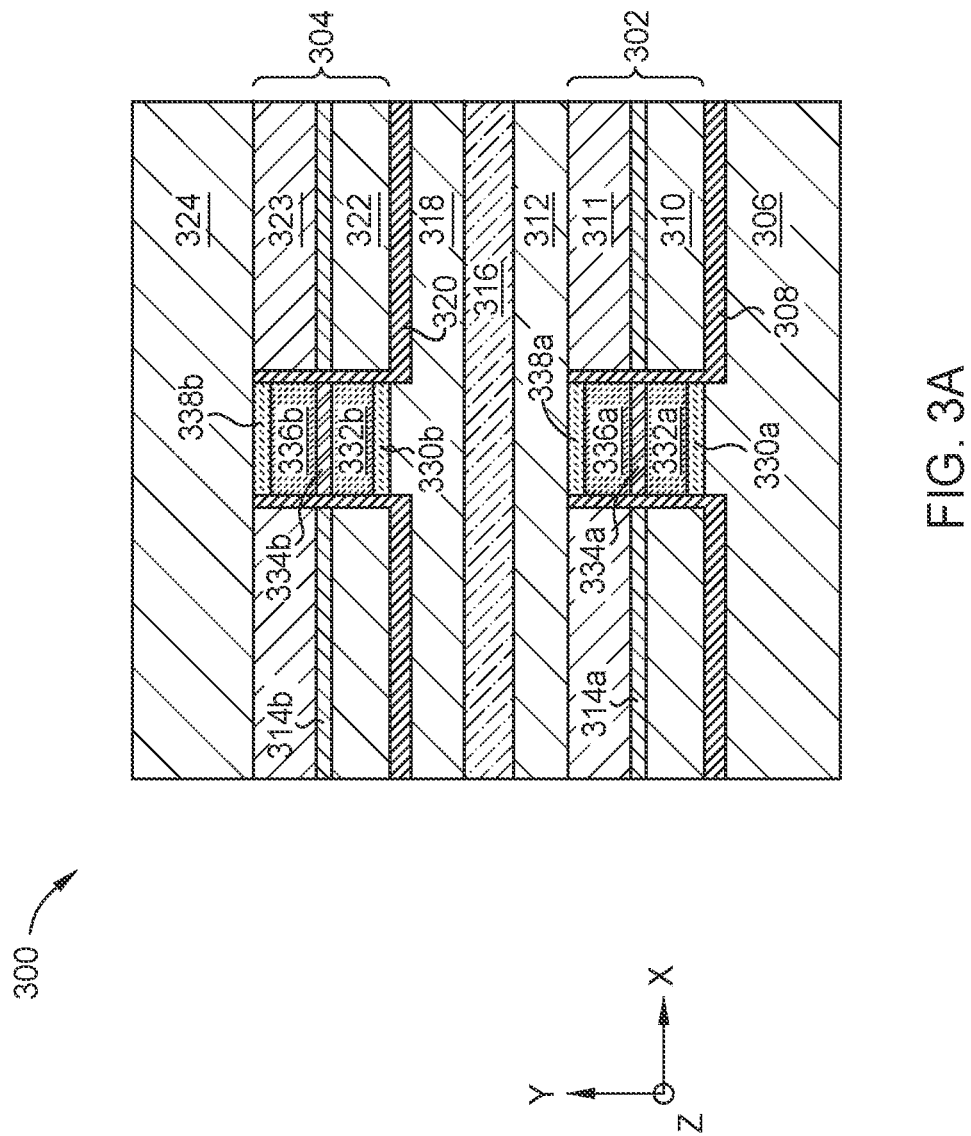
FIGS. 3A-3B illustrate various views of a conventional dual free layer (DFL) two dimensional magnetic recording (TDMR) read head comprising two sensors or readers, according to one embodiment.
Figure 3B:
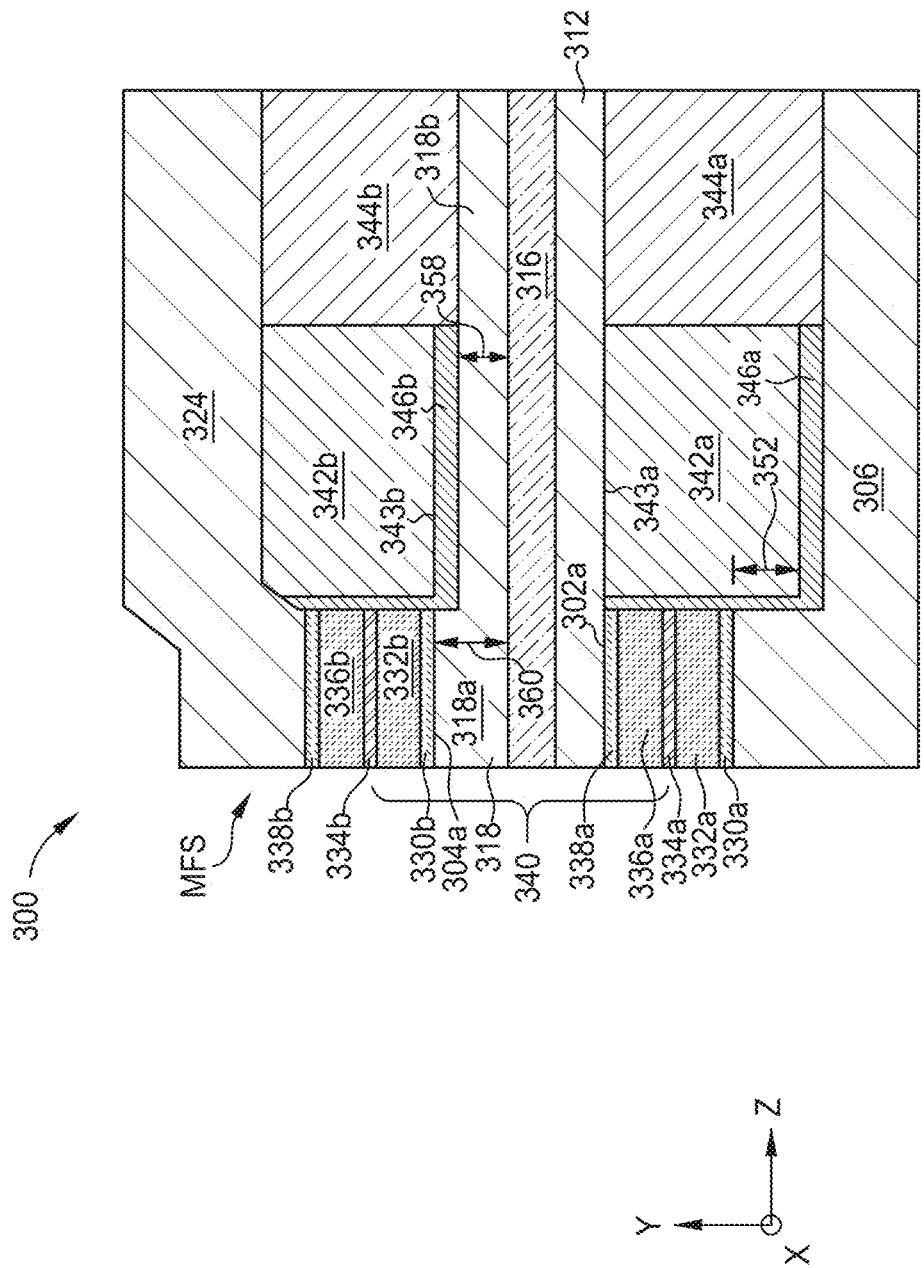

FIGS. 3A-3B illustrate various views of a dual free layer (DFL) two dimensional magnetic recording (TDMR) read head 300 comprising two sensors or readers 302, 304, according to one embodiment. FIG. 3A illustrates a media facing surface (MFS) view of the DFL TDMR read head 300, and FIG. 3B illustrates a cross-sectional view of the DFL TDMR read head 300. The DFL TDMR read head 300 may be the read head 211 in the magnetic recording head 200 in FIG. 2.

The DFL TDMR read head 300 comprises a first lower shield 306, a first insulation layer 308 disposed on the first lower shield 306, a first sensor or reader 302 disposed on the first lower shield 306 between portions of the first insulation layer 308, a first upper shield 312 disposed over the first sensor 302, an insulating layer or read separation gap (RSG) 316 disposed on the first upper shield 312, a second lower shield 318 disposed on the RSG 316, a second insulation layer 320 disposed on the second lower shield 318, a second sensor or reader 304 disposed on the second lower shield 318 between portions of the second insulation layer 320, and a second upper shield 324 disposed over the second sensor 304. The second lower shield 318 may be referred to herein as a middle shield (MS) 318.

The RSG 316 may comprise $SiO_2$, AlOx, where x is an integer greater than or equal to 1, or a combination thereof. The first and second sensors 302, 304 may each individually be tunnel magnetoresistance (TMR) sensors or magnetic tunnel junction (MTJ) sensors. The first and second sensors 302, 304 may be interchangeably referred to as a first reader 302 and a second reader 304 throughout.

The first reader 302 comprises a seed layer 330a, a first free layer 332a disposed on the seed layer 330a, a barrier layer 334a disposed on the first free layer 332a, a second free layer 336a disposed on the barrier layer 334a, and a cap layer 338a disposed on the second free layer 336a. The second reader 304 comprises a seed layer 330b, a first free layer 332b disposed on the seed layer 330b, a barrier layer 334b disposed on the first free layer 332b, a second free layer 336b disposed on the barrier layer 334b, and a cap layer 338b disposed on the second free layer 336b.

A first soft bias layer 310 is disposed on the first insulation layer 308 for the first reader 302 and an anti-ferromagnetically coupled (AFC) layer 314a is disposed between the first soft bias layer 310 and a second soft bias layer 311. Similarly, a first soft bias layer 322 is disposed on the first insulation layer 320 for the second reader and an AFC layer 314b is disposed between the first soft bias layer 322 and a second soft bias layer 323. The first upper shield 312 and the second upper shield 324 may each individually comprise a magnetic material similar to the soft bias material, such as NiFe, NiFe/CoFe laminates, NiFe/NiFeCr laminates, or NiFe/W laminates, for example ("/" as used here denotes separate layers in a multi-layer stack). The first upper shield 312 and the second upper shield 324 may also each individually comprise a magnetic material similar to the soft bias material exchange biased by an antiferromagnet, such as IrMn, IrCrMn. The first upper shield 312 and the second upper shield 324 connect seamlessly to the second soft bias layers 311, 323, respectively. The first insulation layer 308 extends in the y-direction on each side of the first sensor 302 to prevent the first sensor 302 from contacting the first soft bias layer 310, the AFC layer 314a, and the second soft bias layer 311. Similarly, the first insulation layer 320 extends in the y-direction on each side of the second sensor 304 to prevent the second sensor 304 from contacting the second soft bias layer 323, and the AFC layer 314b, and the second soft bias layer 323. The AFC layers 314a and 314b comprise a CoFe/Ru/CoFe tri-layer.

As shown in FIG. 3B, a down-track spacing (DTS) 340 between the first barrier layer 334a of the first sensor 302 and the second barrier layer 334b of the second sensor 304 is about 60 nm to about 150 nm. A first rear hard bias (RHB) structure 342a is disposed behind the first reader 302, recessed from the MFS in the z-direction. A second insulation layer 346a is disposed between the first RHB structure 342a and the first reader 302, and between the first RHB structure 342a and the first lower shield 306. A third insulation layer 344a is disposed behind the first RHB structure 342a. The first, second, and third, insulation layers 308, 346a, and 344a may each individually comprise MgO, AlOx, SiNx, SiOx, and their laminates, where x is an integer greater than or equal to 1.

A first surface 343a of the first RHB structure 342a disposed adjacent to the first upper shield 312 is substantially flush or aligned with a first surface 302a of the first reader 302. In other words, the first RHB structure 342a and the second insulating layer 346a are substantially flush or aligned with the top surface 302a of the cap layer 338a of the first sensor 302 in the z-direction. The first RHB structure 342a of the read head 300 is recessed into the first lower shield 306 a distance 352 of about 15 nm to about 20 nm. Because the first RHB structure 342a is substantially flush or aligned with the first reader 302, the first upper shield 312 and the RSG 316 each extends substantially linearly along the x/z-axis from the MFS into the read head 300 such that the first upper shield 312 and the RSG 316 are planar.

A second RHB structure 342b is disposed behind the second reader 304, recessed from the MFS in the z-direction. A second insulation layer 346b is disposed between the second RHB structure 342b and the second reader 304, and between the second RHB structure 342b and the second lower shield 318. The third insulation layer 344b is disposed behind the second RHB structure 342b. A first surface 343b of the second RHB structure 342b is substantially flush or aligned with a first surface 304a of the second reader 304 in the z-direction. In other words, the second RHB structure 342b is substantially flush or aligned with the bottom surface 304a of the seed layer 330b of the second sensor 304 in the z-direction.

Additionally, in some embodiments, because the first upper shield 312 and the RSG 316 of the DFL TDMR read head 300 are each planar or extend substantially linearly along the x-axis and z-axis, the second lower shield 318 comprises two portions of varying thicknesses. A first portion 318a of the second lower shield 318 disposed at the MFS adjacent to the second reader 304 has a first thickness 360 in the y-direction of about 20 nm to about 30 nm, and a second portion 318b of the second lower shield 318 disposed between the RSG 316 and the second insulation layer 344b has a second thickness 358 in the y-direction of greater than or equal to about 10 nm, such as about 15 nm to about 20 nm.

Figure 4:
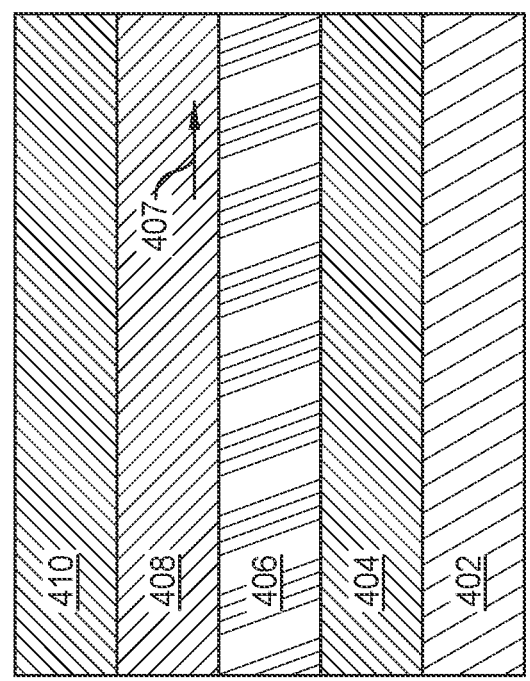
FIG. 4 illustrates a multilayer shield, according to one embodiment.

FIG. 4 illustrates a multilayer shield 400, according to one embodiment. The multilayer shield 400 may be the (MS) 318 of FIGS. 3A-3B, and/or the first lower shield 306 of FIGS. 3A-3B. The multilayer shield 400 is a pinned single shield 400.

The multilayer shield 400 comprises a seed layer 402, an antiferromagnetic layer 404 disposed on the seed layer 402, an insertion layer 406 comprising Ru or CoFe disposed on the antiferromagnetic layer 404, a first ferromagnetic layer 408 disposed on the insertion layer 406, and a cap layer 410 disposed on the first ferromagnetic layer 408. The first ferromagnetic layer 408 has a pinned magnetization direction 407 in the x-direction. The first ferromagnetic layer 408 may comprise NiFe or NiCoFe. The antiferromagnetic layer 404 may comprise IrMn, PtMn, NiMn, FeMn, IrMnCr, and combinations thereof. The first ferromagnetic layer 408 may be referred to herein as a first NiFe layer 408, and the antiferromagnetic layer 404 may be referred to herein as an IrMn layer 404.

The seed layer 402 may comprise one or more of Ta, Ru, NiFeTa, Cr, and NiFeCr, and have a thickness in the y-direction of about 20 Å to about 30 Å, such as about 25 Å. In some embodiments, the seed layer 402 comprises Ta in a thickness between about 5 Å to about 20 Å, such as about 10 Å, and Ru in a thickness of about 10 Å to about 40 Å, as a bilayer. The Antiferromagnetic layer 404 may have a thickness in the y-direction of about 40 Å to about 60 Å. The insertion layer 406 may have a thickness in the y-direction of about 1 Å to about 15 Å, such as about 1.5 Å to about 10 Å. The first ferromagnetic layer 408 may have a thickness in the y-direction of about 100 Å to about 110 Å, such as about 105.5 Å. The cap layer 410 may comprise Ru, for example, and has a thickness in the y-direction of about 20 Å. Thus, the multilayer shield 400 has a total or collective thickness in the y-direction of about 2 μm or less.

The insertion layer 406 comprises either Ru or CoFe. When the insertion layer 406 comprises Ru, the exchange energy (Jex) of the multilayer shield 400 is reduced. When the insertion layer 406 comprises CoFe, the exchange energy of the multilayer shield 400 is increased. As such, the insertion layer 406 allows the multilayer shield 400 to have controllable pinning energy and permeability, preventing rotation of the magnetization of the multilayer shield 400. Thus, the multilayer shield 400 comprising the insertion layer 406 optimizes reader performance without changing the shape of the shield 400 while keeping the shield 400 stable without domain flips.

Figure 5:
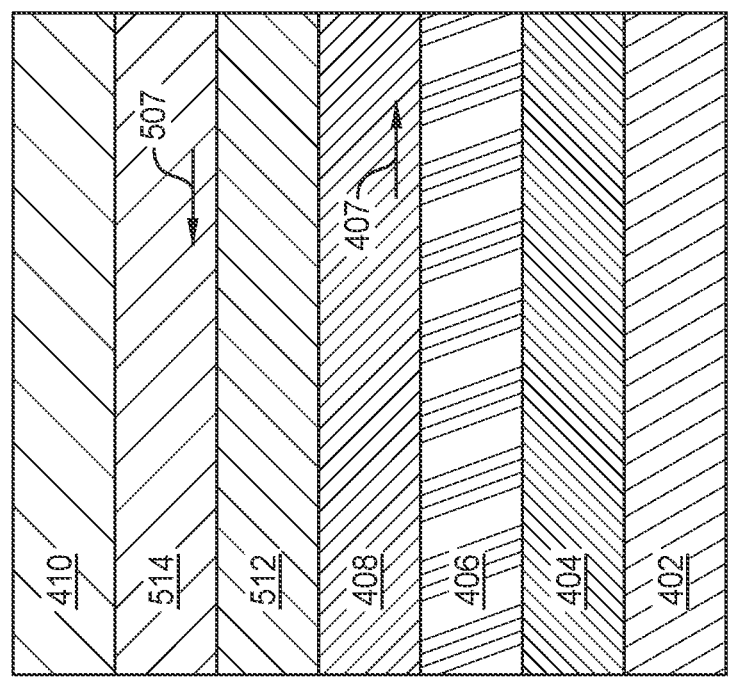
FIG. 5 illustrates a multilayer shield, according to another embodiment.

FIG. 5 illustrates a multilayer shield 500, according to another embodiment. The multilayer shield 500 may be the (MS) 318 of FIGS. 3A-3B, and/or the first lower shield 306 of FIGS. 3A-3B. The multilayer shield 500 is a pinned synthetic antiferromagnetic (SAF) shield 400.

The multilayer shield 500 is similar to the multilayer shield 400; however, the multilayer shield 500 further comprises a Ru, Rh, or Ir layer 512 disposed on the first ferromagnetic layer 408, and a second ferromagnetic layer 514 disposed on the Ru, Rh, or Ir layer 512. The second ferromagnetic layer 514 may comprise NiFe or NiCoFe. The Ru, Rh, or Ir layer 512 has a thickness in the y-direction of about 4 Å to about 9 Å, and the second ferromagnetic layer 514 has a thickness in the y-direction of about 90 Å to about 110 Å, such as about 100 Å. The multilayer shield 500 has a total or collective thickness in the y-direction of about 2 μm or less. The second ferromagnetic layer 514 has a pinned magnetization direction 507 in the −x-direction, anti-parallel to the magnetization direction 407 of the first ferromagnetic layer 408. The second ferromagnetic layer 514 may be referred to herein as a second NiFe layer 514.

Like described in the multilayer shield 400 of FIG. 4, the insertion layer 406 allows the multilayer shield 500 to have controllable pinning energy and permeability, preventing rotation of the magnetization of the multilayer shield 500. Thus, the multilayer shield 500 comprising the insertion layer 406 optimizes reader performance without changing the shape of the shield 500 while keeping the shield 500 stable without domain flips.

Figure 6:
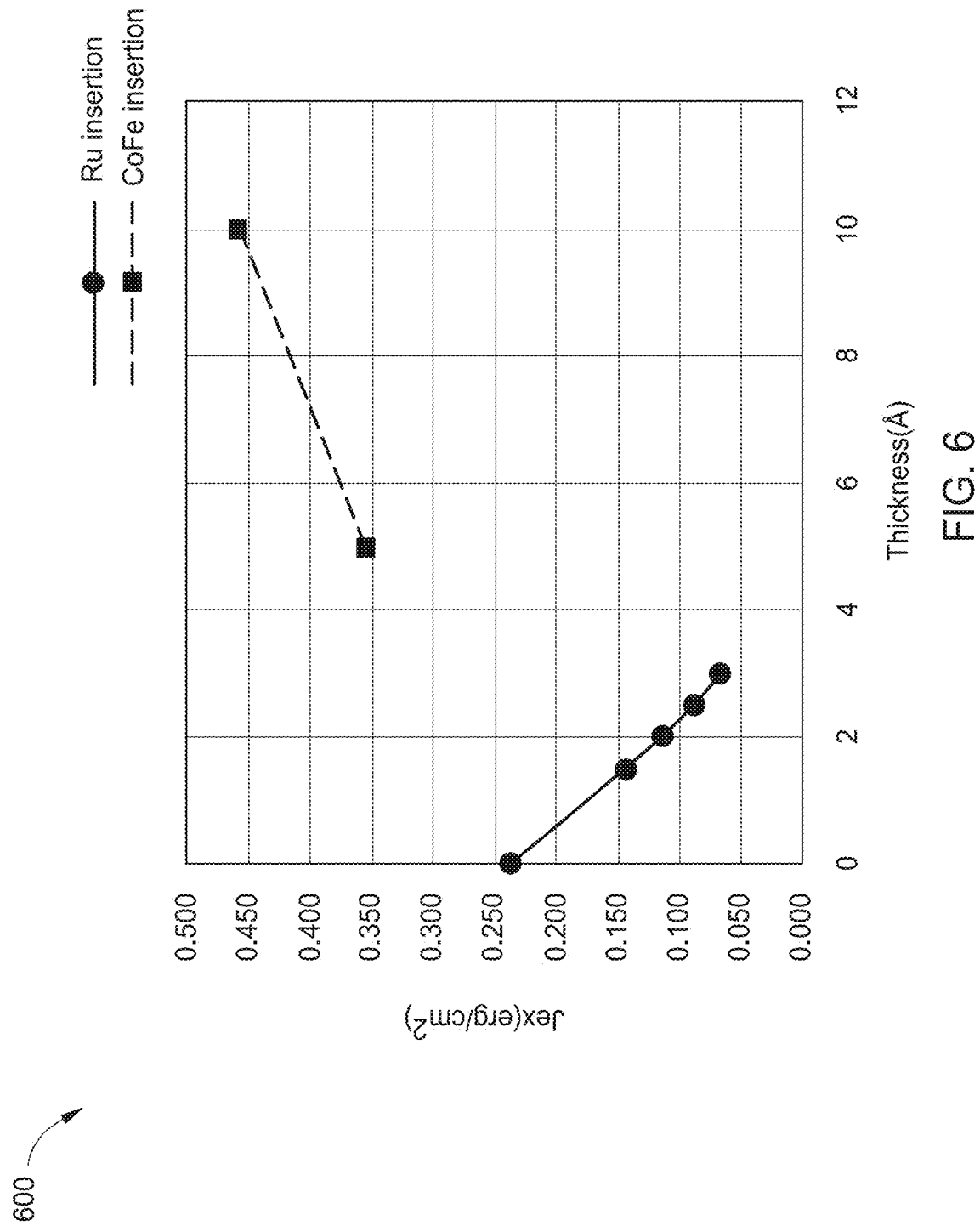
FIG. 6 illustrates a graph of exchange energy (Jex) versus the insertion layer thickness in Å of a shield, according to one embodiment.

FIG. 6 illustrates a graph 600 of exchange energy (Jex) versus the insertion layer thickness in Å of a shield, according to one embodiment. The insertion layer represented in the graph 600 may be the insertion layer 406 of FIGS. 4-5. The shield of the graph 600 may be the multilayer shield 400 of FIG. 4 and/or the multilayer shield 500 of FIG. 5.

As shown in the graph 600, when the insertion layer comprises Ru at a thickness between about 0.1 Å to about 3 Å, the exchange energy decreases to between about 0.05 erg/cm$^2$ to about 0.25 erg/cm$^2$. When the insertion layer comprises CoFe at a thickness between about 5 Å to about 10 Å, the exchange energy increases between about 0.35 erg/cm$^2$ to about 0.45 erg/cm$^2$. Thus, the exchange energy of a shield comprising the insertion layer can be configured as desired, whether to increase or decrease the overall exchange energy, resulting in the exchange and pinning energy being controllable. Thus, of a shield comprising the insertion layer does not experience domain flips, preventing rotation of the magnetization of the shield.

Therefore, a TDMR read head having at least one shield comprising an insertion layer of Ru or CoFe has controllable pinning energy and permeability, and prevents rotation of the magnetization of the shield. The insertion layer of the shield optimizes reader performance without changing the shape of the shield, and while keeping the shield stable without domain flips.

In one embodiment, a two dimensional magnetic recording (TDMR) read head comprises a first read sensor, a second read sensor disposed over the first read sensor, and a middle shield disposed between the first read sensor and the second read sensor, the middle shield comprising: a seed layer, an antiferromagnetic layer disposed on the seed layer, the antiferromagnetic layer comprising IrMn, PtMn, NiMn, FeMn, IrMnCr, and combinations thereof, an insertion layer disposed on the antiferromagnetic layer, the insertion layer comprising Ru or CoFe, and a ferromagnetic layer disposed on the insertion layer, the ferromagnetic layer comprising NiFe or NiCoFe.

The insertion layer comprises Ru, and wherein an exchange energy of the middle shield is between about 0.05 erg/cm$^2$ to about 0.25 erg/cm$^2$. The insertion layer comprises CoFe, and wherein an exchange energy of the middle shield is between about 0.35 erg/cm$^2$ to about 0.45 erg/cm$^2$. The ferromagnetic layer of the middle shield has a pinned magnetization direction. The first read sensor and the second read sensor each individually comprises a first free layer and a second free layer. The middle shield further comprises a cap layer disposed on the ferromagnetic layer. The insertion layer has a thickness of about 1 Å to about 15 Å. A magnetic recording device comprises the TDMR read head.

In another embodiment, a two dimensional magnetic recording (TDMR) read head comprises a first read sensor, a second read sensor disposed over the first read sensor, and a middle shield disposed between the first read sensor and the second read sensor, the middle shield comprising: a seed layer, an antiferromagnetic layer disposed on the seed layer, the antiferromagnetic layer comprising IrMn, PtMn, NiMn, FeMn, IrMnCr, and combinations thereof, an insertion layer disposed on the antiferromagentic layer, the insertion layer comprising Ru or CoFe, a first NiFe or NiCoFe layer disposed on the insertion layer, the first NiFe or NiCoFe layer having a pinned magnetization in a first direction, a Ru, Rh, or Ir layer disposed on the first NiFe layer, a second NiFe or NiCoFe layer disposed on the Ru, Rh, or Ir layer, the second NiFe or NiCoFe layer having a pinned magnetization in a second direction antiparallel to the first direction, and a cap layer disposed on the second NiFe or NiCoFe layer.

The insertion layer comprises Ru and has a thickness of about 1 Å to about 4 Å. The insertion layer comprises CoFe and has a thickness of about 5 Å to about 15 Å. The first read sensor and the second read sensor are each individually dual free layer read sensors. The middle shield has a total thickness of about 2 μm, and wherein the middle shield has an exchange energy between about 0.05 erg/cm$^2$ to about 0.45 erg/cm$^2$. A magnetic recording device comprises the TDMR read head.

In yet another embodiment, a two dimensional magnetic recording (TDMR) read head comprises a first lower shield, a first dual free layer (DFL) read sensor disposed over the first lower shield, a first upper shield disposed over the first DFL read sensor, a middle shield disposed over the first upper shield, the middle shield comprising: a seed layer comprising Ta and Ru, an IrMn layer disposed on the seed layer, an insertion layer disposed on the IrMn layer, the insertion layer comprising Ru or CoFe, a first NiFe layer disposed on the insertion layer, the first NiFe layer having a pinned magnetization in a first direction, and a cap layer disposed over the first NiFe layer, a second DFL read sensor disposed over the middle shield, and a second upper shield disposed over the second DFL read sensor.

The middle shield further comprises a Ru, Rh, or Ir layer disposed on the first NiFe layer, and a second NiFe layer disposed on the Ru, Rh, or Ir layer, the second NiFe layer having a pinned magnetization in a second direction antiparallel to the first direction. When the insertion layer comprises Ru, the middle shield has a thickness of about 1 Å to about 4 Å, and when the insertion layer comprises CoFe, the middle shield has a thickness of about 5 Å to about 15 Å. The first lower shield comprises: a seed layer, an IrMn layer disposed on the seed layer, an insertion layer disposed on the IrMn layer, the insertion layer comprising Ru or CoFe, a first NiFe layer disposed on the insertion layer, the first NiFe layer having a pinned magnetization in a first direction, and a cap layer disposed over the first NiFe layer. The first lower shield further comprises: a Ru, Rh, or Ir layer disposed on the first NiFe layer, and a second NiFe layer disposed on the Ru, Rh, or Ir layer, the second NiFe layer having a pinned magnetization in a second direction antiparallel to the first direction. The TDMR read head further comprises an insulating layer disposed between the first upper shield and the middle shield. A magnetic recording device comprises the TDMR read head.

While the foregoing is directed to embodiments of the present disclosure, other and further embodiments of the disclosure may be devised without departing from the basic scope thereof, and the scope thereof is determined by the claims that follow.

What is claimed is:

1. A two dimensional magnetic recording (TDMR) read head, comprising:
   a first read sensor comprising a first lower shield, the first lower shield comprising:
      a first seed layer;
      an IrMn layer disposed on the first seed layer;
      a first insertion layer disposed on the IrMn layer, the first insertion layer comprising Ru or CoFe; and
      a first NiFe layer disposed on the first insertion layer, the first NiFe layer having a pinned magnetization in a first direction; and
   a second read sensor disposed over the first read sensor; and
   a middle shield disposed between the first read sensor and the second read sensor, the middle shield comprising:
      a second seed layer;
      an antiferromagnetic layer disposed on the second seed layer, the antiferromagnetic layer comprising IrMn, PtMn, NiMn, FeMn, IrMnCr, or combinations thereof;
      a second insertion layer disposed on the antiferromagnetic layer, the second insertion layer comprising Ru or CoFe; and
      a ferromagnetic layer disposed on the second insertion layer, the ferromagnetic layer comprising NiFe or NiCoFe.

2. The TDMR read head of claim 1, wherein the second insertion layer comprises Ru, and wherein an exchange energy of the middle shield is between about 0.05 erg/cm$^2$ to about 0.25 erg/cm$^2$.

3. The TDMR read head of claim 1, wherein the second insertion layer comprises CoFe, and wherein an exchange energy of the middle shield is between about 0.35 erg/cm$^2$ to about 0.45 erg/cm$^2$.

4. The TDMR read head of claim 1, wherein the ferromagnetic layer of the middle shield has a pinned magnetization direction.

5. The TDMR read head of claim 1, wherein the first read sensor and the second read sensor each individually comprises a first free layer and a second free layer, and wherein the middle shield further comprises a cap layer disposed on the ferromagnetic layer.

6. The TDMR read head of claim 1, wherein the second insertion layer has a thickness of about 1 Å to about 15 Å.

7. A magnetic recording device comprising the TDMR read head of claim 1.

8. A two dimensional magnetic recording (TDMR) read head, comprising:

a first read sensor;
a second read sensor disposed over the first read sensor; and
a middle shield disposed between the first read sensor and the second read sensor, the middle shield comprising:
 a seed layer;
 an antiferromagnetic layer disposed on the seed layer, the antiferromagnetic layer comprising IrMn, PtMn, NiMn, FeMn, IrMnCr, or combinations thereof;
 an insertion layer disposed on and in contact with the antiferromagnetic layer, the insertion layer comprising Ru or CoFe;
 a first NiFe or NiCoFe layer disposed on and in contact with the insertion layer, the first NiFe or NiCoFe layer having a pinned magnetization in a first direction;
 a Ru, Rh, or Ir layer disposed on the first NiFe or NiCoFe layer;
 a second NiFe or NiCoFe layer disposed on the Ru, Rh, or Ir layer, the second NiFe or NiCoFe layer having a pinned magnetization in a second direction antiparallel to the first direction; and
 a cap layer disposed on the second NiFe or NiCoFe layer.

9. The TDMR read head of claim 8, wherein the insertion layer comprises Ru and has a thickness of about 1 Å to about 4 Å.

10. The TDMR read head of claim 8, wherein the insertion layer comprises CoFe and has a thickness of about 5 Å to about 15 Å.

11. The TDMR read head of claim 8, wherein the first read sensor and the second read sensor are each individually dual free layer read sensors.

12. The TDMR read head of claim 8, wherein the middle shield has a total thickness of about 2 µm, and wherein the middle shield has an exchange energy between about 0.05 erg/cm$^2$ to about 0.45 erg/cm$^2$.

13. The TDMR read head of claim 8, wherein when the insertion layer comprises Ru, the insertion layer has a thickness of about 1 Å to about 4 Å, and wherein when the insertion layer comprises CoFe, the insertion layer has a thickness of about 5 Å to about 15 Å.

14. A magnetic recording device comprising the TDMR read head of claim 8.

15. A two dimensional magnetic recording (TDMR) read head, comprising:
 a first lower shield;
 a first dual free layer (DFL) read sensor disposed over the first lower shield;
 a first upper shield disposed over the first DFL read sensor;
 a middle shield disposed over the first upper shield, the middle shield comprising:
  a seed layer comprising Ta and Ru;
  an IrMn layer disposed on the seed layer;
  an insertion layer disposed on the IrMn layer, the insertion layer comprising Ru or CoFe;
  a first NiFe layer disposed on the insertion layer, the first NiFe layer having a pinned magnetization in a first direction;
  a Ru, Rh, or Ir layer disposed on the first NiFe layer;
  a second NiFe layer disposed on the Ru, Rh, or Ir layer, the second NiFe layer having a pinned magnetization in a second direction antiparallel to the first direction; and
  a cap layer disposed over the second NiFe layer;
 a second DFL read sensor disposed over the middle shield; and
 a second upper shield disposed over the second DFL read sensor.

16. The TDMR read head of claim 15, wherein when the insertion layer comprises Ru, the insertion layer has a thickness of about 1 Å to about 4 Å, and wherein when the insertion layer comprises CoFe, the insertion layer has a thickness of about 5 Å to about 15 Å.

17. The TDMR read head of claim 15, wherein the first lower shield comprises:
 a second seed layer;
 a second IrMn layer disposed on the second seed layer;
 a second insertion layer disposed on the second IrMn layer, the second insertion layer comprising Ru or CoFe;
 a second NiFe layer disposed on the second insertion layer, the second NiFe layer having a pinned magnetization in the first direction; and
 a second cap layer disposed over the second NiFe layer.

18. The TDMR read head of claim 17, wherein the first lower shield further comprises:
 a second Ru, Rh, or Ir layer disposed on the second NiFe layer; and
 a third NiFe layer disposed on the second Ru, Rh, or Ir layer, the third NiFe layer having a pinned magnetization in the second direction.

19. The TDMR read head of claim 15, further comprising an insulating layer disposed between the first upper shield and the middle shield.

20. A magnetic recording device comprising the TDMR read head of claim 15.

* * * * *